(12) United States Patent
Niezur et al.

(10) Patent No.: US 8,348,581 B2
(45) Date of Patent: Jan. 8, 2013

(54) INTEGRAL TENSIONING MEMBER FOR VARIABLE SHEETMETAL THICKNESS CARRIER ATTACHMENT

(75) Inventors: Michael C. Niezur, Madison Heights, MI (US); Robert B. Davis, Macomb, MI (US)

(73) Assignee: Sika Technology AG, Baar (CH)

( * ) Notice: Subject to any disclaimer, the term of this patent is extended or adjusted under 35 U.S.C. 154(b) by 1708 days.

(21) Appl. No.: 11/654,799

(22) Filed: Jan. 18, 2007

(65) Prior Publication Data

US 2008/0174134 A1    Jul. 24, 2008

(51) Int. Cl.
    *F16B 19/00*    (2006.01)
(52) U.S. Cl. .................. 411/508; 411/47; 411/913
(58) Field of Classification Search .......... 411/508–510, 411/913, 45–48
See application file for complete search history.

(56) References Cited

U.S. PATENT DOCUMENTS

| | | | | |
|---|---|---|---|---|
| 3,373,463 A | * | 3/1968 | Wells | 24/297 |
| 3,486,205 A | | 12/1969 | Smith | |
| 3,693,494 A | * | 9/1972 | Meyer | 411/508 |
| 3,764,729 A | * | 10/1973 | Kowalewski | 174/138 D |
| 3,816,883 A | | 6/1974 | Dzus, Sr. et al. | |
| 4,325,526 A | * | 4/1982 | Kitagawa | 248/73 |
| 4,635,325 A | * | 1/1987 | Yagi | 24/453 |
| 4,635,326 A | * | 1/1987 | Yagi | 24/453 |
| 4,681,288 A | * | 7/1987 | Nakamura | 248/71 |
| 4,795,116 A | * | 1/1989 | Kohut et al. | 248/73 |
| 5,257,861 A | * | 11/1993 | Domenig et al. | 312/334.5 |
| 5,344,257 A | * | 9/1994 | Wright et al. | 405/259.4 |
| 5,368,261 A | * | 11/1994 | Caveney et al. | 248/73 |
| 5,759,004 A | * | 6/1998 | Kuffel | 411/508 |
| 6,164,603 A | * | 12/2000 | Kawai | 248/73 |
| 6,301,113 B1 | * | 10/2001 | Guerrero | 361/704 |
| 6,334,750 B1 | * | 1/2002 | Hsieh | 411/508 |
| 6,364,344 B2 | * | 4/2002 | Hudd et al. | 280/728.2 |
| 6,494,412 B2 | * | 12/2002 | Gombert | 248/65 |
| 6,666,640 B1 | * | 12/2003 | Hsieh | 411/508 |

* cited by examiner

*Primary Examiner* — Roberta Delisle
(74) *Attorney, Agent, or Firm* — Rader, Fishman & Grauer PLLC

(57) ABSTRACT

A carrier for engaging a panel and a method of making a carrier for engaging a panel are disclosed. The carrier generally includes a base portion, an attachment member disposed on the base portion which is operable to engage a panel, and a springbar disposed on the base portion. The method generally includes forming a base portion, forming an attachment member, and forming a springbar on the base portion. The attachment member cooperates with the base portion to define a maximum panel thickness, and the springbar engages panels having a thickness less than or equal to the maximum panel thickness to provide tension between the base portion and a panel.

22 Claims, 3 Drawing Sheets

INTEGRAL TENSIONING MEMBER FOR VARIABLE SHEETMETAL THICKNESS CARRIER ATTACHMENT

BACKGROUND

A variety of manufacturing applications employ plastic carriers or clips which are secured to holes provided in a panel. For example, plastic carriers may be used in automotive applications to provide reinforcement or dampening materials for body panels to improve structural or acoustic properties of the vehicle. Other carrier configurations may be employed with known attachment members to secure various components, e.g., wiring harnesses, to a panel.

Typically, one or more clip towers or attachment members may be provided which are inserted through one or more corresponding holes provided in a sheetmetal panel to engage the sheetmetal panel. The attachment member generally defines a fixed relationship between the carrier body and the panel, such that that carrier engages one side of the panel with the attachment member, and the other side with the body portion, thereby securing the carrier to the panel. While known carrier designs are generally effective for installation to a sheetmetal panel having a predetermined thickness, the fixed relationship between the carrier body and attachment member(s) generally does not allow for installation to panels having different thicknesses. Panels having a narrower thickness may allow installation of the carrier, but leave the carrier loosely attached. Panels having a wider thickness do not allow installation of the carrier at all, as attachment members may not fully engage holes in the panel. The carrier must therefore be entirely redesigned for applications employing different panel thicknesses different, thereby increasing tooling costs for the carrier. This is especially burdensome for carrier manufacturers producing carrier for multiple applications that are very similar with the exception of the panel thickness.

Accordingly, there is a need in the art for a single carrier or clip design which may be used for a variety of panel thicknesses.

DETAILED DESCRIPTION

Various embodiments directed to a carrier for engaging panels having varying thicknesses and a method of making a carrier are disclosed herein. An illustrative embodiment of the carrier includes a base portion, an attachment member disposed on the base portion which is operable to engage a panel, and a tensioning member disposed on the base portion. An illustrative embodiment of a method of making a carrier includes forming a base portion, forming an attachment member, and forming a tensioning member. The attachment member cooperates with the base portion to define a maximum panel thickness, and the tensioning member abuts panels having a thickness less than or equal to the maximum panel thickness to provide tension between the base portion and a panel.

Figure 1:
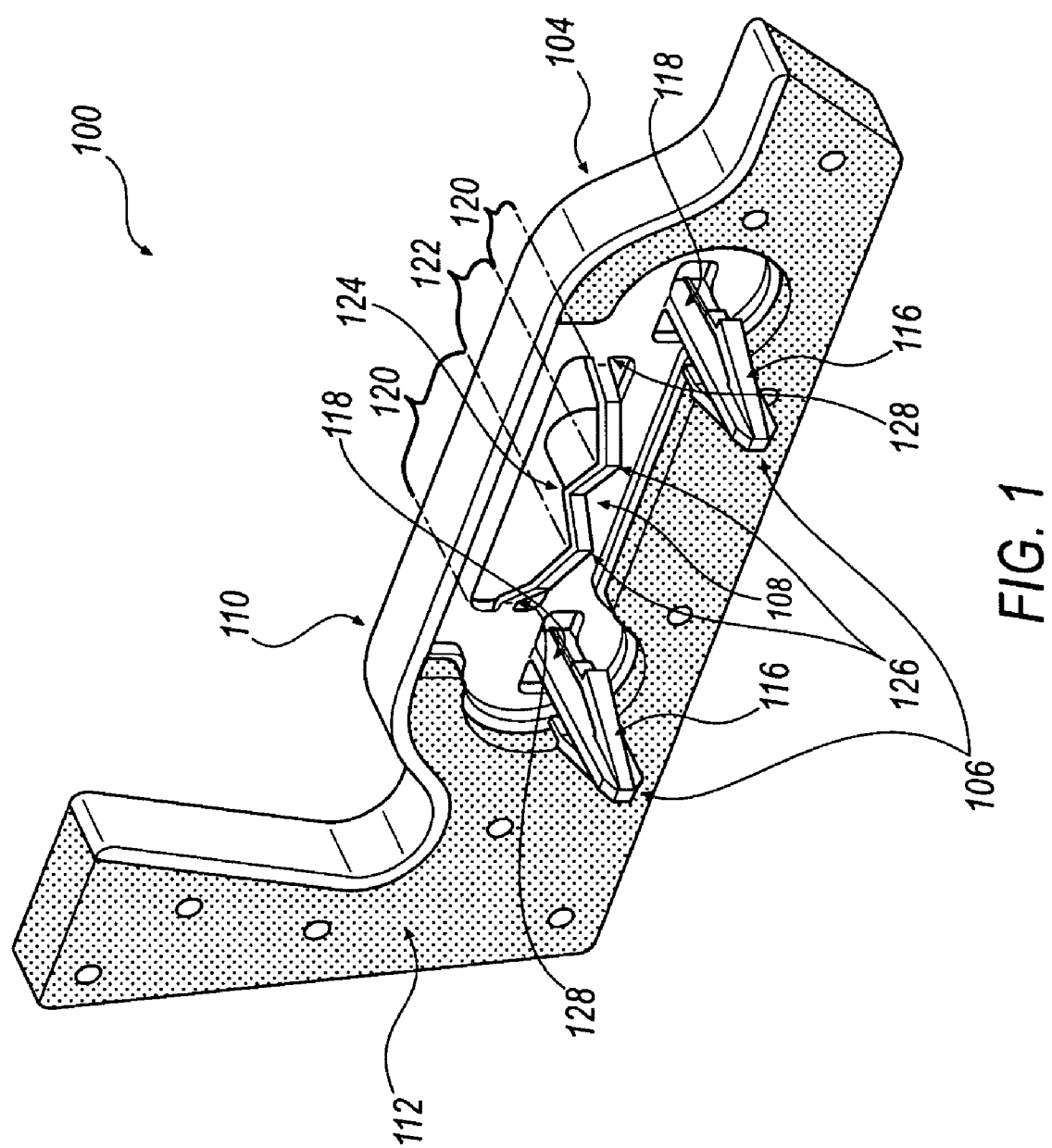
FIG. 1 is a perspective view of a sheetmetal carrier, according to an embodiment.
Figure 2:
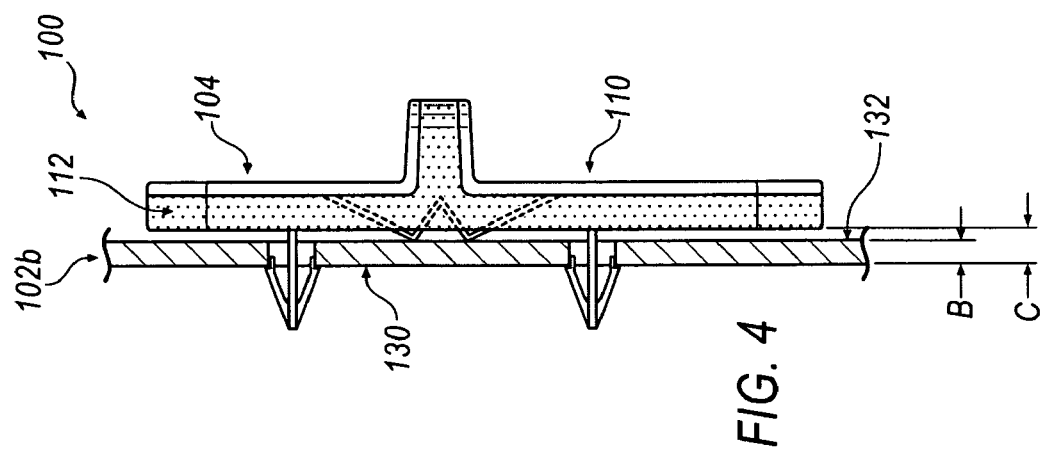
FIG. 2 is a bottom view of a sheetmetal carrier prior to insertion into a sheetmetal panel, according to an embodiment.
Figure 3:
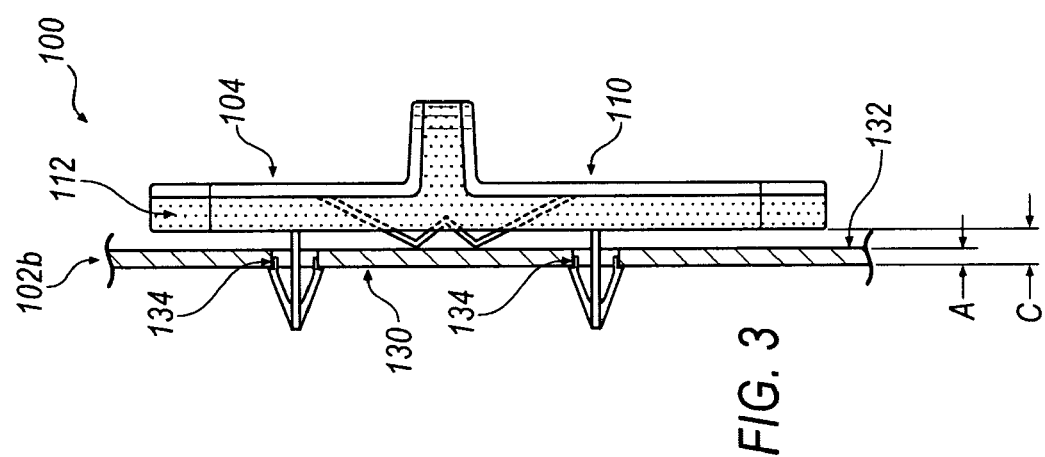
FIG. 3 is a bottom view of a sheetmetal carrier after insertion into a sheetmetal panel having a first thickness, according to an embodiment.
Figure 4:
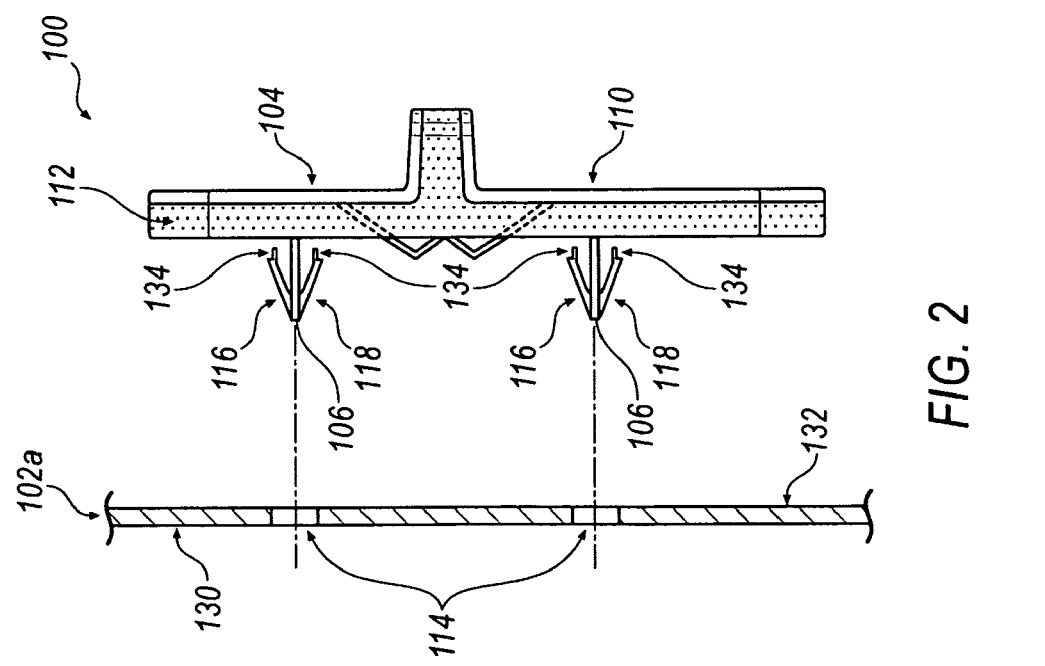
FIG. 4 is a bottom view of a sheetmetal carrier after insertion into a sheetmetal panel having a second thickness, according to an embodiment.

Turning now to FIGS. 1 and 2, a panel clip or carrier 100 is illustrated according to an embodiment. Carrier 100 generally includes a base portion 104, at least one attachment member 106, and a tensioning member 108. Carrier 100 is generally configured to be secured to a panel 102a,b, as shown in FIGS. 2-4. Each attachment member 106 may positively engage panel 102a,b, such as at one or more orifices 114 defined by panel 102a,b which correspond to attachment member 106, as will be described further below.

Base portion 104 may include any carrier body configuration that is generally known. Base portion 104 may be formed of any material by any method generally known that is convenient. For example, base portion 104 may be formed of a nylon or plastic material through an injection molding process. Alternatively, base portion 104 may be formed of a metallic or otherwise malleable material in a stamping operation. Base portion 104 may include a generally flat surface 110 (see FIGS. 2-4). Base portion 104 may additionally include any features or shapes that are convenient. For example, as shown in the Figures, base portion 104 may have an expandable material 112 disposed thereon, generally distributed about flat surface 110. The use and operation of expandable material 112 will be described further below. Alternatively, carrier 100 may provide features which engage other known materials or devices for attachment to panel 102a,b.

Attachment member 106 may include any known attachment mechanism convenient for securing carrier 100 to panel 102a,b that generally provides a positive engagement therebetween. As shown in FIGS. 1-4, attachment member 106 may include a "Christmas tree" or "rosebud" type attachment member, which includes a stem 118 and a tree portion 116 which is configured to be inserted into orifice 114. Tree portion 116 may be inserted into orifice 114, such that tree portion 116 generally deflects inward toward stem 118, thereby allowing further insertion of tree portion 116 into orifice 114. Tree portion 116 may be slightly wider than orifice 114 to allow positive engagement between tree portion 116 and panel 102a,b upon full insertion of tree portion 116 into orifice 114 (see FIGS. 3 and 4). One of skill in the art will generally recognize that a variety of other configurations of attachment member 106 are possible. Further, other features may be provided on panel 102a,b as alternatives to orifices 114 to correspond with attachment member 106 and allow engagement therebetween. For example, attachment member 106 may include any other push-in type fasteners, as are generally known, to engage orifice 114. Alternatively, a tab or doghouse may be provided on carrier 100 for engaging a slot or raised feature in panel 102a,b, respectively, as are generally known. Virtually any other type of positive engagement mechanism may be provided on carrier 100 and/or panel 102a,b to provide engagement therebetween. Attachment member 106 may conveniently be formed integrally with base portion 104. For example, attachment member 106 may be formed integrally with base portion 104 in an injection molding process.

Tensioning member 108 generally abuts panel 102a,b to provide tension between base portion 104 and panel 102a,b, as will be further described below. For example, tensioning member 108 may include a springbar formed in base portion 104, as illustrated in the Figures. Alternatively, tensioning member 108 may include any other known structure for abutting panel 102a,b to provide tension between carrier 100 and panel 102a,b. Tensioning member 108 may include two tab portions 120 which protrude from base portion 104. Tab portions 120 may be joined by bridge portion 122. In embodiments where tensioning member 108 and base portion 104 are integrally molded in an injection-molding operation, bridge 122 may enhance quality of an injection molding process for tensioning member 108 by allowing flow of injected material across the entirety of tensioning member 108. For example, injected material may generally flow from base portion 104 into one of tab portions 120, across bridge portion 122 to the other tab portion 120, and back to base portion 104. However, embodiments are possible wherein tabs 120 are provided without bridge 122. For example, such embodiments may be desirable where tensioning member 108 is formed integrally with base portion 104 in a stamping operation. Tensioning member 108 may include a living hinge at a center portion 124 of bridge 122, at bridge interface regions 126 between each tab 120 and bridge 122, and at tab interface regions 128 between tabs 120 and base portion 104. A living hinge generally includes a thin portion joining thicker member portions to allow flexibility between the members. Accordingly, bridge 122 generally "folds," allowing each tab 120 to deflect towards base portion 104, when pressure is applied to tensioning member 108, e.g., when panel 102a,b contacts tensioning member 108. Tensioning member 108 may thus deflect towards base portion 104 when carrier 100 is secured to panel 102a,b. One of skill in the art will recognize that a compliance or stiffness of tensioning member 108 may be modified by altering a thickness of tabs 120, bridge 122, or living hinges provided at center portion 124 of bridge 122 or interface regions 126, 128. Tensioning member 108 and base portion 104 may be formed by any known method. For example, base portion 104 and tensioning member 108 may be integrally molded as one piece from a plastic or nylon material. Alternatively, base portion 104 may be stamped from a metallic sheet stock, and tensioning member 108 may accordingly be stamped into base portion 104.

An expandable material 112 may be provided on base portion 104. Expandable material 112 may include any variety of known expandable or foaming materials, such as a material that expands upon application of heat. In one embodiment, expandable material 112 expands against panel 102a,b to form a foam baffle material (not shown) that absorbs acoustic energy transmitted adjacent or through panel 102a,b, thereby enhancing acoustic properties of panel 102a,b. Any variety of other features may be provided on base portion 104 that are convenient.

Turning now to FIG. 2, the insertion of carrier 100 into a panel 102a is illustrated. Carrier 100 may initially be adjacent to panel 102a, and then translated toward panel 102a such that tree portions 116 of attachment members 106 are inserted into orifices 114. Tree portions 116 each deflect inward towards stems 118 to allow further insertion of attachment members 106 into orifices 114. Attachment members 106 may be provided with detent portions 134 which positively engage a corner formed by orifice 114 and an opposing surface 130 of panel 102a. Accordingly, attachment member 106 provides a positive engagement between carrier 100 and panel 102a. As attachment member 106 is inserted into orifice 114, tensioning member 108 may contact a facing surface 132 of panel 102a. Tensioning member 108 generally deflects toward base portion 104 to allow full engagement of attachment member 106 with orifice 114. A positive engagement of attachment member 106 with panel 102a may generally prevent carrier 100 from being pulled out of orifice 114 and disengaged from panel 102a. Additionally, a compliance/stiffness of tensioning member 108 provides tension between base portion 104 and panel 102a, thereby generally preventing movement of attachment members 106 within orifice 114 and, accordingly, movement of carrier 100 toward panel 102a. Carrier 100 is thereby generally prevented from movement with respect to panel 102a. Conveniently, attachment members 106 and tensioning member 108 provide a stable three-point engagement between carrier 100 and panel 102a,b at each of attachment members 106 and tensioning member 108, which lies generally between attachment members 106. One of skill in the art will recognize that other embodiments are possible providing a similarly stable relationship between carrier 100 and panel 102a,b. As described above, a compliance of tensioning member 108 may be adjusted by changing a thickness of tabs 120, bridge 122, or any hinge provided at center portion 124 or interface regions 126, 128. For example, lesser compliance, i.e., increased stiffness of tensioning member 108, may be effected by thickening any of tabs 120, bridge 122, or any hinge provided at center portion 124 or interface regions 126, 128, thereby providing increased resistance to relative movement between carrier 100 and panel 102a.

Turning now to FIG. 3, carrier 100 is shown inserted and fully engaged with panel 102a. Detent portions 134 are engaged with a corner of panel 102a formed by orifices 114 and opposing surface 130 of panel 102a. Tensioning member 108 provides a tension between base portion 104 and panel 102a, such that movement of carrier 100 is generally prevented, as generally dictated by a compliance/stiffness of tensioning member 108. One of skill in the art will recognize that a fixed spatial relationship is generally defined by attachment member 106 and base portion 104. This relationship defines a maximum thickness C. Accordingly, any panel 102a,b having a thickness generally equal to or less than maximum thickness C may be used for securing carrier 100.

Turning now to FIG. 4, the insertion of carrier 100 into a panel 102b is illustrated. Panel 102b is shown having a thickness B that is greater than a thickness A of panel 102a shown in FIG. 3. Tensioning member 108 deflects further to accommodate thickness B, while still generally preventing movement of carrier 100 with respect to panel 102b once carrier 100 is engaged with panel 102b. Carrier 100 may therefore be installed to any panel having a thickness that is less than or equal to the maximum thickness C, as tensioning member 108 may deflect toward base portion 104 to accommodate any panel thickness up to the maximum thickness, C.

Figure 5:
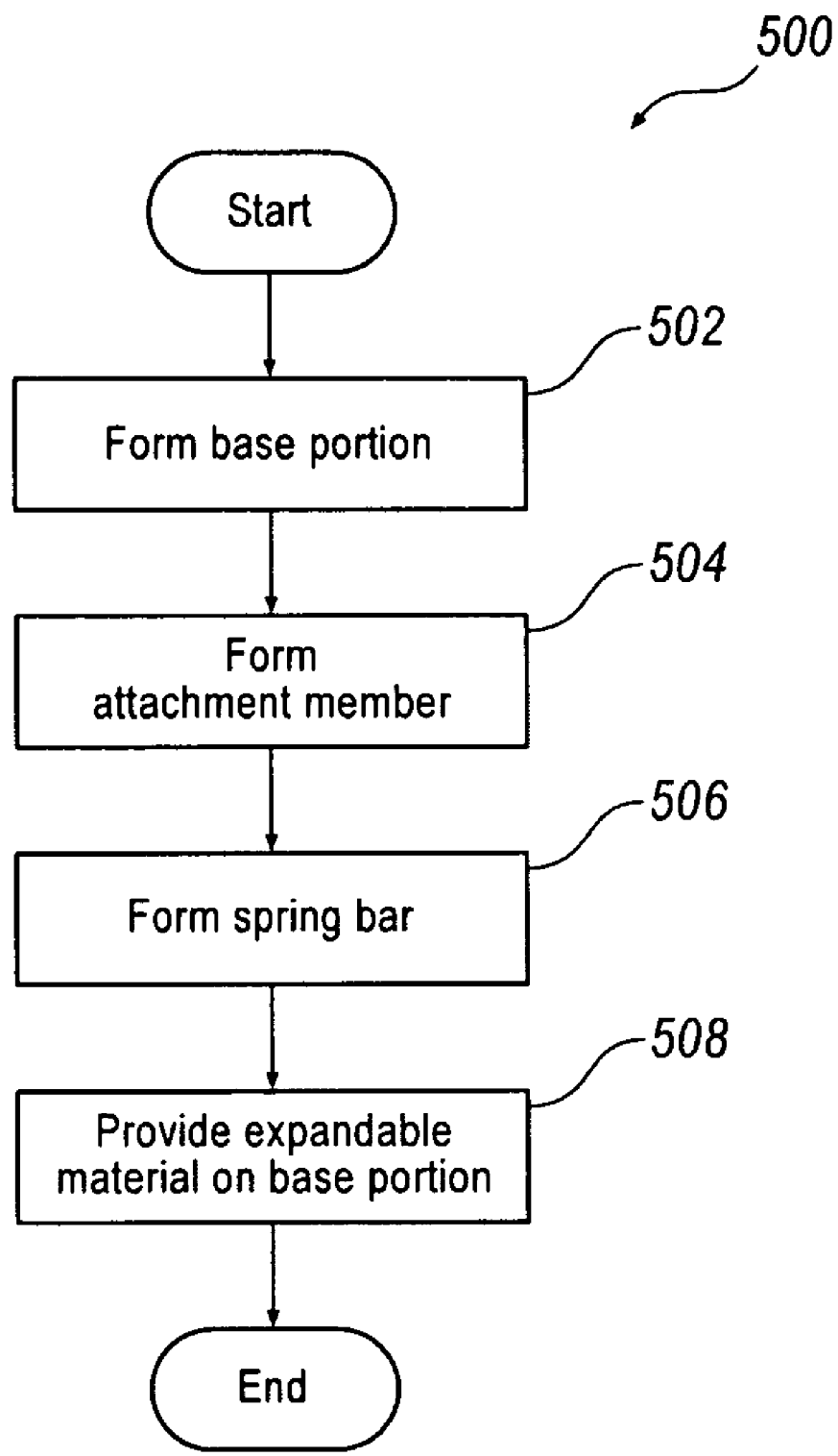
FIG. 5 is a process flow diagram for manufacturing a carrier, according to an embodiment.

Turning now to FIG. 5, an exemplary process 500 for manufacturing carrier 100 is illustrated. Process 500 may begin with step 502, where base portion 104 is formed. Step 502 may include any manufacturing process that is convenient for forming base portion 104. For example, base portion 104 may be injection molded of a plastic or nylon material. Alternatively, base portion 104 may be stamped of a metallic or otherwise malleable material. Further, other known methods may be employed to form base portion 104. Process 500 may then proceed to step 504.

In step 504, at least one attachment member may be formed. For example, attachment member 106 may be integrally formed with base portion 104, e.g., via an injection molding process such that base portion 104 and attachment member 106 are substantially formed in a single injection molding step. Alternatively, attachment member 106 may be formed as a separate piece from base portion 104 and assembled to base portion 104. For example, attachment member 106 may be formed in any known process, and then joined to base portion 104, e.g., by gluing or bonding. Process 500 may then proceed to step 506.

In step 506, tensioning member 108 is formed. For example, tensioning member 108 may be injection molded with base portion 104 in a single injection molding step. Further, in embodiments where attachment member 106 is integrally formed with base portion 104, each of base portion 104, attachment member 106, and tensioning member 108, may be formed in one injection molding step. Alternatively, in embodiments where base portion 104 is stamped, tensioning member 108 may be stamped within a portion of base portion 104. For example, two tab portions 120 may be stamped to protrude from base portion 104. One of skill in the art will generally recognize that a compliance of tensioning member 108 may be adjusted by altering a thickness of various portions of tensioning member 108 and/or base portion 104, as described above.

In step 508, which is optional, an expandable material 112 may be provided on base portion 104. For example, a material which is expandable by the application of heat may be injection molded onto base portion 104. In one embodiment, a material which expands into a foam upon the application of heat is injection molded onto base portion 104 in a two-shot injection molding process. Process 500 may then terminate.

Carrier 100 therefore may be assembled to any panel having a thickness less than or equal to a maximum thickness C defined by a relationship between a positive engagement mechanism, e.g., attachment member 106, and base portion 104. Tensioning member 108 generally provides tension between base portion 104 and panel 102a,b, preventing further movement of carrier 100 toward panel 102a,b, while the positive engagement mechanism generally prevents movement of carrier 100 away from panel 102a,b. Further, multiple engagement points between carrier 100 and panel 102a,b, e.g., two attachment members 106 and tensioning member 108 arranged in a generally triangular relationship, may conveniently provide a stable interface between carrier 100 and panel 102a,b. Accordingly, carrier 100 may be employed for a variety of panels 102a,b with thicknesses less than or equal to a maximum thickness allowed by carrier 100, as generally defined by a relationship between attachment member 106 and base portion 104.

Reference in the specification to "one embodiment" or "an embodiment" means that a particular feature, structure, or characteristic described in connection with the embodiment is included in at least one embodiment. The phrase "in one embodiment" in various places in the specification does not necessarily refer to the same embodiment each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A carrier for engaging panels of varying thicknesses, comprising:
    a base portion;
    at least one attachment member disposed on said base portion, said at least one attachment member configured to engage the panels, said at least one attachment member cooperating with said base portion to define a maximum thickness therebetween, wherein said at least one attachment member is configured to extend through a hole defined by one of the panels to engage a first panel side of the one of the panels; and
    a tensioning member integrally molded with said base portion, said tensioning member configured to abut panels defining a thickness no greater than the maximum thickness to provide tension between said base portion and the panels, wherein said tensioning member is configured to engage a second panel side of the one of the panels, the second panel side opposite the first panel side; said tensioning member including:
        opposing tab portions extending from said base portion to respective ends of the tab portions; and
        a bridge portion joining said ends of the tab portions;
    wherein said at least one attachment member is at least two attachment members, and
    wherein said tensioning member is disposed between said at least two attachment members.

2. The carrier of claim 1, wherein said tensioning member includes a springbar.

3. The carrier of claim 1, wherein said at least one attachment member is configured to engage the at least one hole defined by the panel.

4. The carrier of claim 1, further comprising an expandable material disposed on said base portion, said expandable material configured to expand upon application of heat.

5. The carrier of claim 1, wherein the panel is a sheetmetal panel.

6. The carrier of claim 1, wherein said at least one attachment member includes a rosebud fastener.

7. The carrier of claim 1, wherein said at least one attachment member includes a christmas tree fastener.

8. A method of manufacturing a carrier for engaging panels of varying thicknesses, comprising:
    forming a base portion;
    forming at least one attachment member disposed on said base portion, said attachment member configured to engage the panels to define a maximum thickness between said base portion and said attachment member, wherein said at least one attachment member is configured to extend through a hole defined by one of the panels to engage a first panel side; and
    integrally forming a tensioning member with said base portion, said tensioning member configured to engage panels defining a thickness no greater than the maximum thickness to provide tension between said base portion and the panels, wherein said tensioning member is configured to engage a second panel side opposite the first panel side;

wherein integrally forming said tensioning member includes integrally forming opposing tab portions extending from said base portion to respective ends of the tab portions, and integrally forming a bridge portion joining said ends of the tab portions; and wherein forming said at least one attachment member includes forming at least two attachment members, wherein said tensioning member is formed between said at least two attachment members.

9. The method of claim 8, wherein integrally forming said tensioning member includes integrally forming a springbar.

10. The method of claim 8, wherein forming said at least one attachment member includes integrally molding said at least one attachment member with said base portion.

11. The method of claim 8, wherein integrally forming said tensioning member with said base portion includes molding said tensioning member with said base portion.

12. The method of claim 8, further comprising providing a heat-expandable material disposed on the base portion.

13. The method of claim 8, wherein said at least one attachment member is configured to engage a hole defined by the panel.

14. A carrier for engaging panels of varying thicknesses, comprising:

a base portion;

a positive engagement feature disposed on said base portion, said positive engagement feature configured to engage the panels and define a maximum thickness between said base portion and the panels, wherein said positive engagement feature is configured to extend through a hole defined by one of the panels to engage a first panel side of the one of the panels; and a tensioning member integrally molded with said base portion, said tensioning member configured to abut the panels and provide a tension between said base portion and the panels, wherein said tensioning member is configured to engage a second panel side of the one of the panels opposite the first panel side; said tensioning member including:

opposing tab portions extending from said base portion to respective ends of the tab portions; and a bridge portion joining said ends of the tab portions;

wherein relative movement between the base portion and the panel is generally prevented in a first direction by the tension, and in a second direction by said positive engagement feature;

wherein said positive engagement feature includes at least two positive engagement features, and wherein said tensioning member is disposed between said at least two positive engagement features.

15. The carrier of claim 14, wherein the tensioning member includes a springbar.

16. The carrier of claim 1, wherein said bridge portion includes a hinge, thereby allowing deflection of said tab portions toward said base portion.

17. The carrier of claim 1, wherein said bridge portion is configured to fold, thereby allowing deflection of said tab portions toward said base portion.

18. The method of claim 8, wherein integrally forming said bridge portion includes forming a hinge in said bridge, the hinge allowing deflection of said tab portions toward said base portion.

19. The method of claim 8, further comprising establishing said bridge portion as configured to fold when the bridge engages the panel, thereby allowing deflection of said tab portions toward said base portion.

20. The carrier of claim 1, wherein the opposing tab portions are each attached to said base portion by tab interface regions, the opposing tab portions each extending away from said base portion and from said tab interface regions to said respective ends, said respective ends each defining bridge interface regions, the bridge interface regions attached to opposing ends of said bridge portion.

21. The carrier of claim 1, wherein the second panel side is defined by a facing surface of the one of the panels, and the first panel side is defined by an opposing surface of the one of the panels, wherein the facing surface and opposing surface are defined by opposing faces of the one of the panels.

22. The carrier of claim 14, wherein at least one of said positive engagement features includes an attachment member.

* * * * *